(12) United States Patent
Rakotondrainibe et al.

(10) Patent No.: US 11,441,739 B2
(45) Date of Patent: Sep. 13, 2022

(54) EMPTYING SYSTEM FOR EMPTYING A RESERVOIR WITH A FLUID CONTROL SYSTEM FOR A VALVE FOR CONNECTING THE RESERVOIR TO A VENT

(71) Applicant: AREVA Stockage d'Energie, Aix-en-Provence (FR)

(72) Inventors: André Rakotondrainibe, Aix-en-Provence (FR); Franck Verbecke, Velaux (FR); Jean-Claude Reybaud, La Penne-sur-Huveaune (FR)

(73) Assignee: AREVA Stockage d'Energie, Aix-en Provence (FR)

( * ) Notice: Subject to any disclaimer, the term of this patent is extended or adjusted under 35 U.S.C. 154(b) by 340 days.

(21) Appl. No.: 16/634,871

(22) PCT Filed: Aug. 3, 2018

(86) PCT No.: PCT/IB2018/055871
§ 371 (c)(1),
(2) Date: Jan. 28, 2020

(87) PCT Pub. No.: WO2019/026048
PCT Pub. Date: Feb. 7, 2019

(65) Prior Publication Data
US 2020/0208784 A1   Jul. 2, 2020

(30) Foreign Application Priority Data
Aug. 1, 2017   (FR) ........................................ 1757374

(51) Int. Cl.
*F17C 13/04*   (2006.01)
*F17C 7/00*   (2006.01)
*F17C 13/12*   (2006.01)

(52) U.S. Cl.
CPC ................ *F17C 13/04* (2013.01); *F17C 7/00* (2013.01); *F17C 13/12* (2013.01);
(Continued)

(58) Field of Classification Search
CPC .... F17C 13/04; F17C 13/12; F17C 2221/012; F17C 2260/042
See application file for complete search history.

(56) References Cited

U.S. PATENT DOCUMENTS 4,671,319 A * 6/1987 Namand ................. F17C 13/04
137/488
5,042,520 A   8/1991 Reznik

FOREIGN PATENT DOCUMENTS

DE   102011119668 A1   5/2013
DE   102013008215 A1 * 11/2014 ............. F16K 15/18
(Continued)

OTHER PUBLICATIONS

English Machine Translation of DE102013008215A1 (Year: 2013).*
International Search Report for Patent Application No. PCT/IB2018/055871, dated Dec. 4, 2018, 3 pp.

*Primary Examiner* — Kenneth Rinehart
*Assistant Examiner* — Nicole Gardner
(74) *Attorney, Agent, or Firm* — Soquel Group LLC

(57) ABSTRACT

An system for emptying at least one reservoir containing a pressurized fluid, including, for each reservoir, a vent for discharging the fluid out of the reservoir and a discharge valve for connecting the reservoir to the vent, the emptying system additionally including, for each discharge valve, a return member for returning the discharge valve to its closed configuration, and a fluid control system for controlling the movement of each discharge valve to its open configuration by action of an operating fluid on the discharge valve, the control system including an operating station arranged outside a danger zone around each reservoir, and, for each
(Continued)

discharge valve, a fluid pipe fluidically connecting the operating station to the discharge valve, the operating station including at least one reversible free connection for connecting to each fluid pipe of a device for supplying the control system with operating fluid.

8 Claims, 1 Drawing Sheet

(52) U.S. Cl.
CPC ............... *F17C 2205/0332* (2013.01); *F17C 2221/012* (2013.01); *F17C 2223/0123* (2013.01); *F17C 2223/036* (2013.01); *F17C 2260/042* (2013.01)

(56) References Cited

FOREIGN PATENT DOCUMENTS

| | | |
|---|---|---|
| DE | 102014205712 A1 | 10/2015 |
| FR | 1372746 A | 9/1964 |
| FR | 2524960 A1 | 10/1983 |
| WO | 2014183841 A1 | 11/2014 |

\* cited by examiner

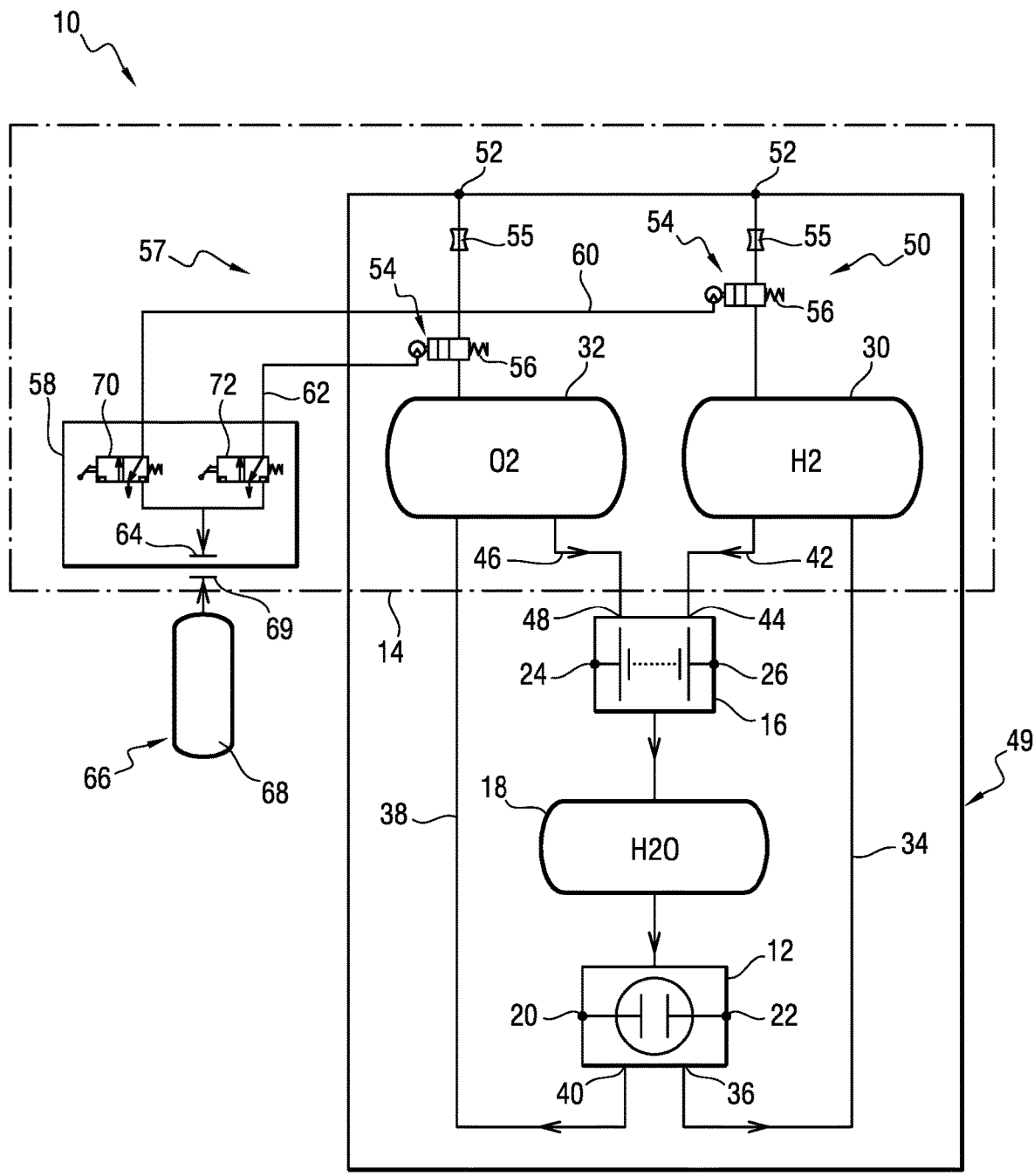

EMPTYING SYSTEM FOR EMPTYING A RESERVOIR WITH A FLUID CONTROL SYSTEM FOR A VALVE FOR CONNECTING THE RESERVOIR TO A VENT

CROSS-REFERENCE TO RELATED APPLICATIONS

This application claims benefit under 35 USC § 371 of PCT Application No. PCT/EP2018/055871 entitled EMPTYING SYSTEM FOR EMPTYING A RESERVOIR WITH A FLUID CONTROL SYSTEM FOR A VALVE FOR CONNECTING THE RESERVOIR TO A VENT, filed on Aug. 3, 2018 by inventors Andre Rakotondrainibe, Franck Verbecke and Jean-Claude Reybaud. PCT Application No. PCT/EP2018/055871 claims priority of French Patent Application No. 17 57374, filed on Aug. 1, 2017.

FIELD OF THE INVENTION

The present invention relates to an emptying system for emptying at least one reservoir containing a pressurized fluid, wherein said emptying system comprises, for the or each reservoir, a vent for discharging the fluid out of the reservoir and a discharge valve for connecting the reservoir to the vent, the discharge valve being movable between an open configuration, in which the discharge valve fluidly connects the reservoir to the vent, and a closed configuration, in which the reservoir and the vent are fluidly isolated from one another by the discharge valve, the emptying system further comprising, for the or each discharge valve, a return member for returning the discharge valve to the closed configuration, and a fluid control system for controlling the movement of the or each discharge valve to the open configuration by action of an operating fluid on the discharge valve, said control system comprising an operating station, arranged outside a danger zone around the or each reservoir, and, for the or each discharge valve, a fluid pipe fluidly connecting the operating station to the discharge valve.

The invention also relates to a fluid storage device comprising such an emptying system, and an energy storage device in chemical form comprising such a fluid storage device for storing secondary fluids obtained by electrolysis of at least one primary fluid.

BACKGROUND OF THE INVENTION

The generalization of the intermittent electrical energy sources constituted by renewable energy sources, such as solar power plants or wind turbines, has made it necessary to develop temporary energy storage solutions making it possible to smooth out the electrical energy supplied by these sources to the electrical grids. One explored solution is the storage of energy in chemical form, in which at least one primary fluid is electrolyzed so as to produce secondary fluids, between which an oxidation-reduction reaction is later produced, producing electrical energy. Exemplary applications of this solution in particular consist of redox flow batteries and systems combining electrolyzers and fuel cells.

One problem encountered with this type of solution is the safety of the storage of secondary fluids between their production and their use. Oftentimes, these secondary fluids are dangerous fluids, in particular because they may present an explosion risk, for example as is the case with dihydrogen.

The storage of the secondary fluids must thus satisfy certain safety rules. In particular, regarding the storage of secondary fluids entailing an explosion risk, the storage must allow the emptying of the latter so that these secondary fluids are dispersed into the atmosphere and the explosion risk disappears. Such emptying must be made possible in case of incident having occurred on the storage site, and must be able to be done while preserving the safety of persons.

Fluid storage solutions exist allowing the emptying of a reservoir storing explosive products by an operator acting from a control station located outside a danger zone around the reservoir. Such a solution is disclosed in WO 2014/183841, in which the emptying valves of a storage reservoir for a flammable fluid are controlled remotely using a pneumatic system.

One drawback of the solution disclosed in this document is that it is not reliable. Indeed, an unauthorized person can easily engage the emptying system, typically through an ill-intentioned act, leading to the loss of the stored energy. Furthermore, the system can only be used a number of times limited by the capacity of the reservoirs supplying the pneumatic system.

SUMMARY OF THE DESCRIPTION

One aim of the invention is thus to avoid the untimely and ill-intentioned actuating of the emptying system of a device for storing pressurized fluid. Another aim of the invention is to allow an unlimited use of the emptying system.

To that end, the invention relates to an emptying system of the aforementioned type, in which the operating station comprises at least one reversible free connection for connecting to the or each fluid pipe of a supply device for supplying the control system with the operating fluid.

According to specific embodiments of the invention, the emptying system also comprises one or more of the following features, considered alone or according to any technically possible combination(s):

- the fluid control system is made up of a pneumatic control system, the operating fluid being formed by a pressurized gas;
- the operating station comprises, for the or each fluid pipe, a control valve fluidly inserted between the free connection and the fluid pipe, the control valve being movable between an open configuration, in which the control valve fluidly connects the free connection to the fluid pipe, and a closed configuration, in which the free connection and the fluid pipe are fluidly isolated from one another by the control valve; and
- the control valve is controlled manually.

The invention also relates to a fluid storage device comprising at least one reservoir containing a pressurized fluid, the storage system also comprising an emptying system for emptying said reservoirs made up of an emptying system as defined above, the or each discharge valve of the emptying system being fluidly connected to a respective reservoir of the fluid storage device so as to be fluidly interposed between said reservoir and a vent of the emptying system.

According to specific embodiments of the invention, the storage device also has one or more of the following features, considered alone or according to any technically possible combination(s):

the fluid storage device comprises at least two reservoirs; and the fluid contained in a first of said reservoirs is dihydrogen and/or the fluid contained in the second reservoir is dioxygen.

The invention further relates to an energy storage system comprising a device for producing a first and a second secondary fluid by electrolysis of at least one primary fluid, and a storage device for secondary fluids in order to store the first and second secondary fluids separately, and a fuel cell for generating electrical energy by oxidation-reduction reaction between the first and second secondary fluids, in which the storage device is a fluid storage device as defined above.

According to one particular embodiment of the invention, this energy storage system also has the following feature: the first secondary fluid is dihydrogen.

The invention also relates to a method for emptying the fluid storage device as defined above, having the following successive steps:

connecting the reversible free connection of an operating fluid supply device compatible with the reversible free connection, establishing a fluid link between the supply device and at least one fluid pipe, resulting in an increase in the pressure of the operating fluid in the fluid pipe, moving the discharge valve fluidly connected to the fluid pipe toward the open position under the effect of the pressure of the operating fluid in the fluid pipe, and discharging the fluid contained in the reservoir to which the discharge valve is fluidly connected via said discharge valve and a vent of the emptying system.

BRIEF DESCRIPTION OF THE DRAWING

Other features and advantages of the invention will appear more clearly upon reading the following description, provided solely as a non-limiting example, and done in reference to the appended FIGURE, which shows a block diagram of an energy storage system according to the invention.

DETAILED DESCRIPTION

The energy storage system 10 shown in this FIGURE comprises an electrolyzer 12 for producing a first secondary fluid and a second secondary fluid by electrolysis of a primary fluid. The storage system 10 also comprises a device 14 for storing secondary fluids in order to store the first and second secondary fluids separately, and a fuel cell 16 for generating electrical energy by oxidation-reduction reaction and restoring the primary fluid between the first and second secondary fluids. Preferably, the storage system 10 also comprises, as shown, a device 18 for storing the primary fluid.

In the illustrated example, the primary fluid is water. The first secondary fluid is then dihydrogen, and the second secondary fluid is dihydrogen.

The electrolyzer 12 has electric terminals 20, 22 electrically connected to an electrical energy source (not shown) typically made up of a solar power plant or a wind turbine. The fuel cell 16 also has electric terminals 24, 26 that are in turn electrically connected to a charge consuming electrical energy, for example an electric grid.

The storage device 14 for the secondary fluids comprises, in a known manner, a first reservoir 30 for storing the first secondary fluid and a second reservoir 32 for storing the second secondary fluid. The first reservoir 30 is fluidly connected by a first supply pipe 34 to a first fluid outlet 36 of the electrolyzer 12, and the second reservoir 32 is fluidly connected by a second supply pipe 38 to a second fluid outlet 40 of the electrolyzer 12. The first reservoir 30 is also fluidly connected by a first outlet pipe 42 to a first fluid inlet 44 of the fuel cell 16, and the second reservoir 32 is fluidly connected by a second outlet pipe 46 to a second fluid inlet 48 of the fuel cell 16.

The first fluid inlet 44 fluidly supplies an anode compartment (not shown) of the fuel cell 16, and the second fluid inlet 48 fluidly supplies a cathode compartment (not shown) of the fuel cell 16, said cathode and anode compartments being separated from one another by ion exchange membranes (not shown).

The reservoirs 30, 32 are placed inside an enclosure 49 typically formed by a building.

The storage device 14 for the secondary fluids also comprises a system 50 for emptying the reservoirs 30, 32. This emptying system 50 comprises, for each of the reservoirs 30, 32, a vent 52 for the discharge of the fluid contained in the reservoir 30, 32 outside the reservoir 30, 32, and in particular outside the chamber 49, a discharge valve 54 for the fluid connection of the reservoir 30, 32 to the vent 52, fluidly interposed between the reservoir 30, 32 and the vent 52, and advantageously, a diaphragm 55 inserted fluidly between the valve 54 and the vent 52 in order to keep the fluid pressure between the diaphragm 55 and the vent 52 at a pressure substantially equal to the atmospheric pressure.

Each discharge valve 54 is movable between an open configuration, in which the discharge valve 54 fluidly connects the reservoir 30, 32 to the vent 52, and a closed configuration, in which the reservoir 30, 32 and the vent 52 are fluidly isolated from one another by the discharge valve 54.

The emptying system 50 further comprises, for each discharge valve 54, a return member 56 returning the discharge valve 54 toward its closed configuration. This return member 56 is typically formed by a spring.

The emptying system 50 further comprises a fluid control system 57 in order to control the movement of the discharge valves 54 toward their open configuration by action of an operating fluid on each discharge valve 54. This control system 57 comprises a shared operating station 58, outside a danger zone around the reservoirs 30, 32, a first control fluid pipe 60 fluidly connecting the operating station 58 to the discharge valve 54 of the first reservoir 30, and a second control fluid pipe 62 fluidly connecting the operating station 58 to the discharge valve 54 of the second reservoir 32.

"Arranged outside the danger zone around the reservoirs 30, 32" means that the operating station 58 is placed at a sufficient distance from the reservoirs 30, 32 so as not to be reached in case of explosion of the fluid contained in one or the other of these reservoirs 30, 32. To that end, the operating station 58 is preferably arranged outside the enclosure 49. In a variant, in the absence of a separating wall between the operating station 58 and the reservoirs 30, 32, the operating station 58 is preferably arranged at a distance from each reservoir 30, 32 of several tens of meters.

According to the invention, the operating station 58 comprises a reversible free connection 64 for the connection to the fluid control pipes 60, 62 of a supply device 66 of the control operating fluid control system 57. This reversible free connection 64 is typically made up of a quick and secure connection of the gas fluids that can be supplied either by a pressurized fluid cartridge, or by a pressurized fluid external source. Thus, the actuation of the control system 57 is reserved solely for people equipped with a supply device 66 that is compatible with the free connection 64, that is to say, configured to be fluidly connected to the free connection 64, which makes it possible to avoid untimely and ill-intentioned activations of the emptying system 50.

Preferably, the supply device 66 is formed, as shown, by a reservoir 68 storing the pressurized operating fluid. It is equipped with a connection end 69 fluidly connected to the reservoir 68 and compatible with the free connection 64, that is to say, configured to cooperate with the free connection 64 so as to produce a fluid link between said end 69 and the free connection 64.

Advantageously, the fluid control system 57 is made up of a pneumatic control system. The operating fluid is then made up of a pressurized gas, for example air or an inert gas such as nitrogen. The supply device 66 is thus much more compact than in the case where the operating fluid had been formed by a liquid.

The operating station 58 also comprises, for each control pipe 60, 62, a control valve 70, 72 fluidly interposed between the free connection 64 and the control pipes 60, 62. Each control valve 70, 72 is movable between an open configuration, in which it fluidly connects the free connection 64 to the associated fluid pipe 60, 62, and a closed configuration, in which the free connection 64 and said fluid pipe 60, 62 are fluidly isolated from one another by the control valve 70, 72. Thus, it is possible for the operator to control the emptying speed of the reservoirs 30, 32. It is also possible for him to perform this control independently on each reservoir 30, 32.

Preferably, each control valve 70, 72 is controlled manually, that is to say, it is configured to be done by hand by an operator. Such valves are known and are generally referred to as "manual dispensers".

An operating method of the energy storage system 10 will now be described.

When the electrical energy produced by the electrical source exceeds that requested by the grid, the excess produced electrical energy is used to supply the electrolyzer 12. Under the effect of this electrical energy, the electrolyzer 12 hydrolyzes water supplied to it by the storage device 18. The water is thus separated into dihydrogen, which is conducted by the pipe 34 into the first reservoir 30, where it is stored under pressure, and dioxygen, which is conducted by the pipe 38 into the second reservoir 32, where it is also stored under pressure. The first and second reservoirs 30, 32 thus continue to fill with dihydrogen and dioxygen as long as the electrical energy produced by the source exceeds that requested by the grid.

When the electrical energy produced by the source is less than that requested by the grid, the fuel cell 16 begins to run to supply the missing electrical energy. To that end, the fuel cell 16 is supplied via the pipes 42, 46 with the dihydrogen and the dioxygen stored in the reservoirs 30, 32. This dioxygen and this dihydrogen undergo an oxidation-reduction reaction in the fuel cell producing the desired electrical energy, as well as water. This water is harvested in the storage device 18 in anticipation of the moment where the electrical energy produced by the electrical source once again becomes greater than that requested by the grid.

When an event occurs requiring the depressurization of the reservoirs 30, 32, an operator takes hold of a supply device 66 compatible with the free connection 64 and connects the end 69 of this supply device 66 to the free connection 64. He next actuates the control valves 70, 72 in order to switch them to the open configuration. The pressurized fluid supplied by the supply device 66 then propagates in each control pipe 60, 62 to each discharge valve 54, on which it acts to move said valve 54 to the open position.

The dihydrogen and the dioxygen contained in the reservoirs 30, 32 can then escape through the vents 52, until the reservoirs 30, 32 are empty. Any explosion risk of the reservoirs 30, 32 is then eliminated.

Owing to the invention described above, it is possible to empty the secondary fluid storage device 14 in complete safety. The system 57 for controlling the valves 54 being a fluid system, this emptying can be done without adding electrical energy, which makes it possible to operate even in case of short-circuit and without a backup generator.

One additional advantage of this invention is that it avoids the untimely triggering of the emptying system 50 by reserving the actuation of the valves 54 only for people equipped with supply devices 66 compatible with the free connection 64. These supply devices 66 being kept compact owing to the use of a pneumatic control system 57 to control the valves 54, the need to use such supply devices 66 does not hinder the action capabilities of qualified people.

It will be noted that, although the invention has been disclosed in the case where the electrical energy/chemical energy conversion is provided by the electrolyzer-fuel cell pair, the invention is not limited to this embodiment alone. In a variant (not shown), the electrical energy/chemical energy conversion is provided by a reversible fuel cell, the energy storage device 10 then constituting a redox flow battery. The primary fluid is then stored in the second reservoir 32 with the second secondary fluid, this reservoir 32 not being equipped with a discharge valve 54. This primary fluid is typically made up of hydrobromic acid, the first secondary fluid then being dihydrogen and the second secondary fluid being $Hbr_3$ (complex of hydrobromide and Bromine). It will also be noted that the invention is not limited solely to energy storage systems, but also extends to systems for emptying reservoirs used in other applications, for example in the context of storing chemical products intended to supply production lines and industrial transformation lines.

The invention claimed is:

1. An energy storage system, comprising:
 a fluid storage device, comprising:
  at least one reservoir containing a pressurized fluid; and
  an emptying system for emptying said at least one reservoir, comprising:
   for each reservoir:
    a vent discharging fluid out of the reservoir; and
    a discharge valve connecting the reservoir to said vent, the discharge valve being movable between an open configuration, in which the discharge valve fluidly connects the at least one reservoir to said vent, and a closed configuration, in which the at least one reservoir and said vent are fluidly isolated from one another;
   a fluid control system controlling the movement of each discharge valve to the open configuration by action of an operating fluid on the discharge valve, comprising an operating station, arranged outside a danger zone around each reservoir, comprising at least one reversible free connection for connecting to one or more fluid pipes of a supply device for supplying the fluid control system with the operating fluid; and
   for each discharge valve:
    a return member returning the discharge valve to the closed configuration; and
    a fluid pipe fluidly connecting said operating station to the discharge valve;

a device producing a first and a second secondary fluid by electrolysis of at least one primary fluid, wherein said fluid storage device stores the first and secondary fluids separately; and a fuel cell generating electrical energy by oxidation-reduction reaction between the first and second secondary fluids.

2. The energy storage system according to claim 1, wherein said fluid control system comprises a pneumatic control system, the operating fluid being formed by a pressurized gas.

3. The energy storage system according to claim 1, wherein said operating station comprises, for each fluid pipe, a control valve fluidly inserted between the free connection and the fluid pipe, the control valve being movable between an open configuration, in which the control valve fluidly connects the free connection to the fluid pipe, and a closed configuration, in which the free connection and the fluid pipe are fluidly isolated from one another by the control valve.

4. The energy storage system according to claim 3, wherein said control valve is manually controlled.

5. The energy storage system according to claim 1, comprising at least two reservoirs.

6. The energy storage system according to claim 5, wherein the fluid contained in a first of said reservoirs is dihydrogen and/or the fluid contained in a second of said reservoirs is dioxygen.

7. The energy storage system according to claim 1, wherein the first secondary fluid is dihydrogen.

8. A method for emptying a fluid storage device, comprising:
providing an energy storage system according to claim 1;
connecting a reversible free connection of the operating station of the emptying system of the energy storage system to an operating fluid supply device;
establishing a fluid link between the supply device and the fluid pipe of a discharge valve of the emptying system, resulting in an increase in the pressure of the operating fluid in the fluid pipe;
moving the discharge valve toward the open position under the effect of the pressure of the operating fluid in the fluid pipe; and
discharging the fluid contained in the reservoir of the energy storage system to which the discharge valve is fluidly connected via the discharge valve and the vent of the reservoir.

* * * * *